United States Patent [19]
Gunderson

[11] Patent Number: 6,073,220
[45] Date of Patent: Jun. 6, 2000

[54] APPARATUS AND METHOD FOR PROVIDING A TRANSPARENT DISK DRIVE BACK-UP

[75] Inventor: Dick Gunderson, Ione, Calif.

[73] Assignee: DuoCor, Inc., Nevada City, Calif.

[21] Appl. No.: 08/922,403

[22] Filed: Sep. 3, 1997

[51] Int. Cl.[7] .................................................... G06F 12/00
[52] U.S. Cl. .......................... 711/162; 711/161; 711/112; 714/3
[58] Field of Search .................................. 711/162, 161, 711/112; 395/182.04; 714/3

[56] References Cited

U.S. PATENT DOCUMENTS

| | | | |
|---|---|---|---|
| 4,754,397 | 6/1988 | Varaiya et al. | 364/200 |
| 5,159,671 | 10/1992 | Iwami | 395/250 |
| 5,212,784 | 5/1993 | Sparks | 364/200 |
| 5,321,826 | 6/1994 | Ushiro | 395/425 |
| 5,553,230 | 9/1996 | Petersen et al. | 395/180 |
| 5,611,069 | 3/1997 | Matoba | 395/441 |
| 5,734,340 | 3/1998 | Kennedy | 341/59 |
| 5,787,485 | 7/1998 | Fitzgerald et al. | 711/162 |

OTHER PUBLICATIONS

Peter Norton, "Inside the IBM PC", pp. 155–156, 381–382, Dec. 1986.

*Primary Examiner*—Eddie P. Chan
*Assistant Examiner*—Kimberly McLean
*Attorney, Agent, or Firm*—Thomas, Kayden, Horstemeyer & Risley

[57] ABSTRACT

A method and corresponding apparatus provide a backup drive in a computer system having a CPU, a memory, an operating system executing between the CPU and the memory, and a first and second storage device. In accordance with one aspect of the invention, the method includes the steps of designating the first storage device as a primary drive and designating the second storage device as a backup drive. It further includes the step of making the backup drive appear invisible to the operating system. Preferably, the invention accomplishes this step by writing a specified value to the device identification location (address 01FE and 01FF of the boot sector). Thereafter, the invention writes data from the primary drive to the backup drive on a periodic basis, using direct basic input/output service (BIOS) calls. It will be appreciated that, since the drive is "invisible" to the operating system, that direct BIOS calls are required in order to write data to, or read data from, the backup drive. Finally, the invention includes the step of redesignating the primary drive and the backup drive upon receiving a control command. The control command could be a user initiated command, or it could be automatically generated upon error detection. For example, if the system detects a fatal error on the primary drive, it may generate a control command that prompts the invention to redesignate the primary and secondary drives. This is accomplished (basically) by rewriting the values stored in the device identifying locations, thus making the backup drive now visible to the system and the primary drive invisible.

26 Claims, 6 Drawing Sheets

APPARATUS AND METHOD FOR PROVIDING A TRANSPARENT DISK DRIVE BACK-UP

BACKGROUND OF THE INVENTION

1. Field of the Invention

The present invention generally relates to utility programs for computers, and more particularly to a utility program for adapting a computer system to provide a backup drive that mirrors a primary drive, which is ready at all times to substitute in place of the primary drive in the event of failure of the primary drive.

2. Discussion of the Related Art

Since the introduction of the personal computer, personal computer technology has proliferated at an incredible pace. As personal computers grow in size, performance, and complexity, the need for a fast and dependable backup/restore mechanism also increases. There is, however, a general disparity in such computers between the medium used for primary programs and data—fixed hard disk drives—and that used for backing up those programs and data, generally magnetic tape drives, floppy disks, or removable hard disks.

As is known, a fixed hard disk drive is a random-access device having a read/write head that does not come into contact with the disk itself, but can seek data in any track and sector as it moves over the rotating disk. In contrast, a backup tape drive is a sequential access device having a head that is typically in continuous contact with the tape medium during seek, read, and write operations. Floppy disks, and removable hard disks, operate similarly to fixed hard disks, but suffer other shortcomings. Namely, floppy disks are usually smaller in capacity than fixed disks, and thereby require multiple units to back up one fixed disk. In addition, they are less reliable over time due to their portable design, which entails an inherently less rigid form of construction, as well as exposure to extremes of temperature, dust, moisture, and magnetic fields in the process of being removed, transported, and stored.

These disparities give rise to awkward adjustments when using one of these media to back up data from and restore data to a fixed disk drive. Generally, one has to locate and copy from data stored either in sequential order, or scattered over multiple units. At a minimum, one has to invest in frequent purchases of new backup media in order to guard against their reduced reliability. The consequence is that restoring a crashed disk, or even a single corrupted file, can involve considerable investment and down time on the part of the user.

With the increasing size of removable drives, it has become more feasible to use them to archive data. By way of terminology, however, an archival device is not the same as a backup device. A backup device is meant to serve as a stand-in, ready at a moment's notice to take over primary functions in the event of a main drive failure. To be useful, it must therefore be constantly updated to reflect the current state of the main system. In contrast, an archival device enables the long-term storage of data that will need only infrequent access in the future. It is written to once, and then put away for safekeeping.

No medium will best fulfill all the functions and objectives of a backup (in contrast to an archival) device for home and personal computers unless it is fungible, i.e., interchangeable with the primary medium. One example of an acceptable fungible medium is another fixed disk drive with a capacity that is either equal to, or greater than, the capacity of the primary drive(s).

This design objective, however, entails certain risks and difficulties, particularly in personal computers. To function most effectively as a backup disk, a fixed hard drive is connected as an integral part of the computer which it is designed to serve. At the same time, the backup fixed disk drive should not be accessible through the computer's normal operating system (and thus "visible" to a user) since erroneous accesses could corrupt the integrity of the files on the backup drive.

Another difficulty in providing a robust backup device relates to mirroring the operating system of the primary drive on the backup drive. Duplicating the operating system files themselves on a second fixed drive that is visible to that same operating system can also lead to random system crashes and irregularities. An important design objective of a backup device is that the backup disk itself must be easily converted into a primary unit if it becomes necessary to substitute it for the primary drive. By way of analogy, the problem is akin to designing a body with two hearts: the second heart must be ready at all times to take over the primary heart's functions with a minimum of hesitation or delay, but at the same time, it must not be allowed to interfere with the normal circulatory functions performed by the primary heart.

Prior art devices for both small and large computer systems have generally failed to address these specific issues. Because the cost of fixed storage capacity is a significant factor in small computer systems, the redundant arrays and multiple-drive concurrent backup systems designed in the past for large systems do not feasibly translate to desktop systems typically used by individuals in the office or at home. The backup systems designed in the past for desktop computers have either involved disparate (and hence non-fungible) backup media, or simultaneous writing of data to two hard drives that are both visible at all times to the operating system, with consequent problems and risks as noted above.

Accordingly, it is desired to provide a system and method that achieves both backup and restore functions for personal computers with a maximum of speed, efficiency and reliability. At the same time, it is desired to provide a system and method that is applicable to larger systems as well. In such larger system, a significant cost savings can be achieved because of the reduction in the number of backup disks needed, and the reduction in processing time devoted to backups.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a backup system (method and apparatus) for providing a backup drive in a computer system having a CPU, a memory, an operating system executing between the CPU and the memory, and a first and second storage device. In accordance with one aspect of the invention, a method includes the steps of designating the first storage device as a primary drive and designating the second storage device as a backup drive. It further includes the step of making the backup drive appear invisible to the operating system. Preferably, the method accomplishes this step by writing a specified value to the device identification location (e.g., address 01FE and 01FF of the boot sector). Thereafter, the preferred method writes data from the primary drive to the backup drive on a periodic basis, using direct basic input/output service (BIOS) calls. It will be appreciated that, since the drive is "invisible" to the operating system, direct BIOS calls are required in order to write data to, or read data from, the backup drive. Finally, the method includes the step of redesignating the primary drive and the backup drive upon receiving a control command. The control command may be a user initiated command, or it could be automatically generated upon error detection. For example, if the system detects a fatal error on the primary drive, it may generate a control command that prompts the invention to redesignate the primary and secondary drives. This is generally accomplished by rewriting the values stored in the device identifying locations, thus making the backup drive now visible to the system and the primary drive invisible.

The backup system of the preferred embodiment maintains various information about each storage device that is independent of whether the storage device is designated as the primary drive or the backup drive. For example, the backup system maintains tables of bad sectors on the storage devices, so that the backup system does not attempt to read or write to those locations, this information being independent of the status of the device as either primary or backup. In addition, the system may need to perform minor reconfiguration steps when drives are redesignated. For example, it will be appreciated that the backup drive is preferably at least as large (in terms of capacity) as the primary drive (or portion thereof) being backed up. Suppose the primary drive is a one giga-byte drive, while the backup drive is a four giga-byte drive. When the drives are redesignated, clearly the entirety of the four giga-byte drive cannot be backed up onto the one giga-byte drive. Thus, the system will need to designate that portion of the four giga-byte drive that was used to back up the primary drive, and back up only that portion onto the one-giga-byte drive (the newly designated backup drive). Alternatively, the system may partition a physical drive and utilize the various partitions as primary and backup drives.

In accordance with another aspect of the present invention, a computer system having a memory and a central processing unit (CPU) is provided. The computer system further includes a first storage device having a device identifying mechanism and a second storage device having a device identifying mechanism. Preferably, the device identifying mechanisms are simply locations in the boot sector that identify the devices to a conventional operating system as being a disk drive. In this regard, the system will further include an operating system responsive to a predetermined state of (value in) the device identifying mechanism of the first and second storage devices, for execution between the memory and the CPU, as is well known. The operating system has conventional access to the first and second storage devices, wherein the access is controlled by the state of the device identifying mechanism (e.g., the value in the identifying location of the boot sector) of each device. The system further includes means for designating the first storage device as a primary drive and the second storage device as a backup drive, wherein the means is operative to control the state of the device identifying mechanism (e.g., the value in the identifying location of the boot sector) of each of the storage devices. In addition, means are provided for periodically copying data from the primary drive to the backup drive. In this regard, the means preferably includes a code segment that issues direct BIOS calls to write data directly to the backup drive. It will be appreciated that data cannot be written to the backup drive in the conventional manner (i e., through the operating system), since the drive is "invisible" to the system. Finally, means responsive to a control condition are provided for redesignating the second storage device as the primary drive and the first storage device as the backup drive. In this regard, the means is operative to control the state of the device identifying mechanism (e.g., the value in the identifying location of the boot sector) of each of the storage devices.

Thus, the present invention provides a system for backing up files, programs, data and other information on one or more primary disk drives to a backup disk drive or drives of equal or greater size and capacity, and of restoring said files, programs, data and other information in the event of their loss or corruption. At the same time, it provides a mirror image replacement of the primary drive or drives that is continually available for swapping into the system in the event of a partial or total failure of the primary drive or drives.

Preferably, the invention also works with virtually any kind of data storage medium that can be read from and written to within a given computer operating system. The preferred embodiment employs media that are randomly accessible within milliseconds and that have large storage capabilities, i.e., hard disk drives, removable disk drives, optical drives, or similar devices. The embodiment disclosed herein contemplates one or more fixed hard disk primary drives in a personal or home computer, and one or more fixed hard disk backup drives with a capacity equal to or greater than that of the primary drive(s) assigned to it. The backup drives are made invisible to the operating system when the invention's backup software is installed, and may be accessed only through the backup software. The files on the backup drive(s) are binary copies of their counterparts on the primary drive(s).

When a user initiates the backup process, he or she will have specified which items are to be backed up: either a single file or collection of files, or just those files which have changed since the previous backup operation, or an entire primary drive (or partition), or all primary drives (or partitions) in sequence. Once the user selects the backup process, the backup software assumes control from the operating system of all seek, read, write and verify operations. By means of direct calls at the device level, the backup software makes a mirror-image copy on the selected backup drive of the items selected for backing up. Controls are present to ensure that data cannot be written to a bad sector on the backup drive, and to verify the correctness of the copying once the data are written. At the end of the backup process, the backup software allows the user the option of exiting the program and returning to the operating system, or of selecting additional options within the program.

The restore process works substantially in reverse of the backup process. The software enables the user to compare the version of a file currently residing on a primary drive with the version currently existing on the corresponding backup drive; it also tells the user when there is no counterpart, as (for example) when a new file has been created and not yet backed up, or when the primary file has been inadvertently deleted. The user then selects which file or files are to be used as the source for the restore operation, and the software preliminarily verifies the identity of the primary drive onto which the restored copy is to be placed. The software then copies an exact mirror image of the selected source file(s) onto the designated primary drive. As is the case with backup operations, controls are present to ensure that data cannot be written to a bad sector on the designated drive, and to verify the correctness of the copying once the data are written. At the end of the restore process, the backup software allows the user the option of exiting the program and returning to the operating system, or of selecting additional options within the program.

In the event of a total or partial failure of a primary operating drive, the user can substitute the mirror-image backup of that drive within seconds or minutes, depending on the particular configuration of the user's system. The backup software generates upon installation a specially configured floppy disk that is used in the event of primary drive failure. After changing any necessary jumper connections on the backup drive (to convert it, if necessary, from a "slave" to a "master" on the drive channel), the user chooses a "restore" program on the special floppy disk, which converts the formerly invisible backup drive into a bootable primary drive. The user then reboots with the new primary drive, and is back up and running with all of the files (and operating system) intact. The user may then install a new (or repaired) backup drive, configure the backup software appropriately, and proceed as before.

The backup software of the preferred embodiment also provides options for the user to schedule backups at periodic intervals, or alternatively at specified particular times. Preferably, these backups will either occur automatically or after a prompt to the user which gives the user the option to delay backup if the user does not want to interrupt other uses of the computer.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims. In this regard, the concepts and examples shown should be considered as exemplars of the principles, rather than as limitations on the system or method of the invention.

Figure 1:
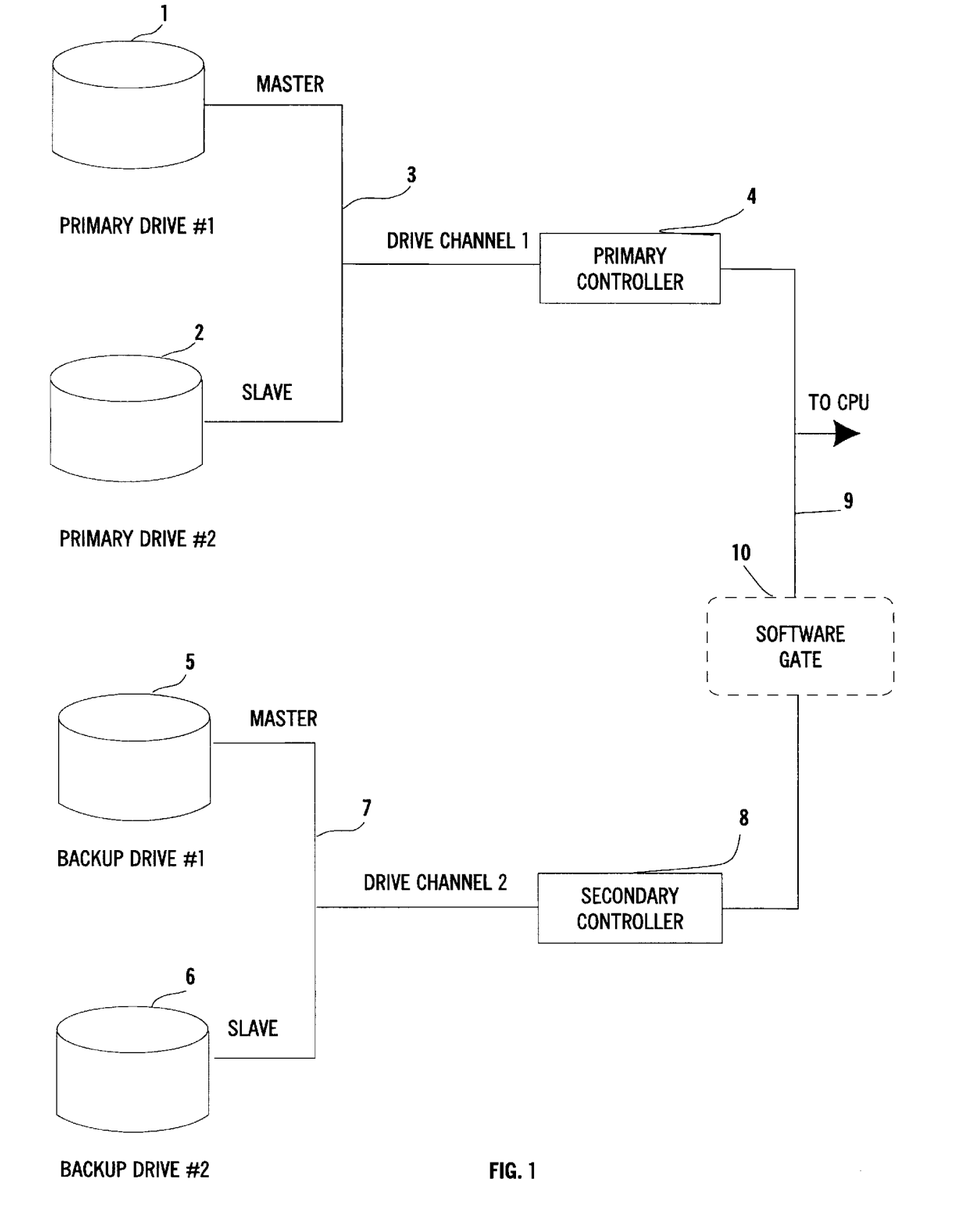
FIG. 1 is a block diagram showing the configuration of a home or personal computer primary and backup fixed drive system according to one embodiment of the present invention.

FIG. 1 shows a block diagram of a portion of a typical architecture in a personal or home computer system in which this invention could be used. While four fixed hard disk drives are illustrated in the system, other embodiments of the present invention include two, three, five, six, and even greater numbers, limited only by the addressing capabilities of the system architecture and the resident operating system. In still other embodiments, the devices 1, 2, 5, and 6 may be disk partitions instead of physical disk drives. The first drive 1 is denoted as the primary boot drive, from which the computer boots itself on powering up. That drive is shown configured as a "Master" on a first drive channel 3, which is connected to a primary disk controller 4. Certain system architectures include data or drive channels on which it is possible to connect two or more disk drives or other storage devices, such as Compact Disc—Read Only Memory devices (CD-ROMs), or removable disk drives. An example of one such drive channel is an Integrated Device Electronics (IDE) channel found on many personal computers. An IDE channel can accommodate two devices on a channel, with one designated as "master" and the other designated as a "slave". The designations are frequently set by jumpers on the devices themselves, or in more recent systems, they are configured in the computer memory itself, as part of the Basic Input/Output System (BIOS), when a system set-up program is accessed from Read-Only Memory (ROM) on system start-up. The illustrated embodiment depicts two primary drives 1 and 2 configured as Master and Slave, respectively, on the first (IDE) drive channel 3, and two secondary or backup drives 5 and 6 configured as Master and Slave, respectively, on the second (IDE) drive channel 7, which in turn is connected to the secondary disk controller 8. Of course, consistent with the concepts and teachings of the present invention, two drive configurations other than the illustrated Master/Slave configuration may be used.

Both the primary disk controller 4 and the secondary disk controller 8 operate in a manner that is well known, and are joined on a bus 9 that connects to the computer's Central Processing Unit, or CPU (not shown). This architecture permits the CPU to read data from, and send data for writing to, any of the drives on the system—in this case, drives 1, 2, 5 or 6.

This connectivity between the CPU and all system disk drives is a basic function of computer system architecture. It is, however, the source of the problems in using hard disk drives as full backup devices, for the reasons discussed above. To overcome these and other related problems, the present invention is provided and includes a gate 10 shown in abstract form as the conduit through which all read and write data must pass in going between the CPU, the secondary disk controller 8, and the backup drives 5 and 6 that are controlled by that controller. The actual gate 10 of the preferred embodiment is implemented by means of a combination of software and hardware, as is hereinafter explained. The Gate 10 is illustrated in dashed line to indicate that the physical location of the Gate is not along the bus 9 or anywhere in it. Instead, it resides (for the most part) in system memory, from which it strictly controls access through the CPU to and from the Secondary (Backup) Controller 8 along the data bus 9. All such access is handled not at the system level, via the interfaces built into the operating system, but at the basic device level, through direct calls to the backup drives made through BIOS.

The software which comprises part of the present invention is loaded into system memory on command from the user within the operating system, when the user wishes to perform backup/restore operations. In this regard, the software of the present invention may be designed to run under any of a number of platforms, such as Microsoft Windows.® Thus, the software of the invention does not always (necessarily) reside in memory, and therefore cannot in and of itself control access to the backup drives when it is not operating. To prevent and control access to and from the backup drives 5 and 6 when the Backup Software is not resident in memory, the present invention further includes a means for rendering the backup drives "invisible" to conventional computer operating systems. This goal could be accomplished in any number of different ways, one of which is illustrated in FIG. 2.

Figure 2:
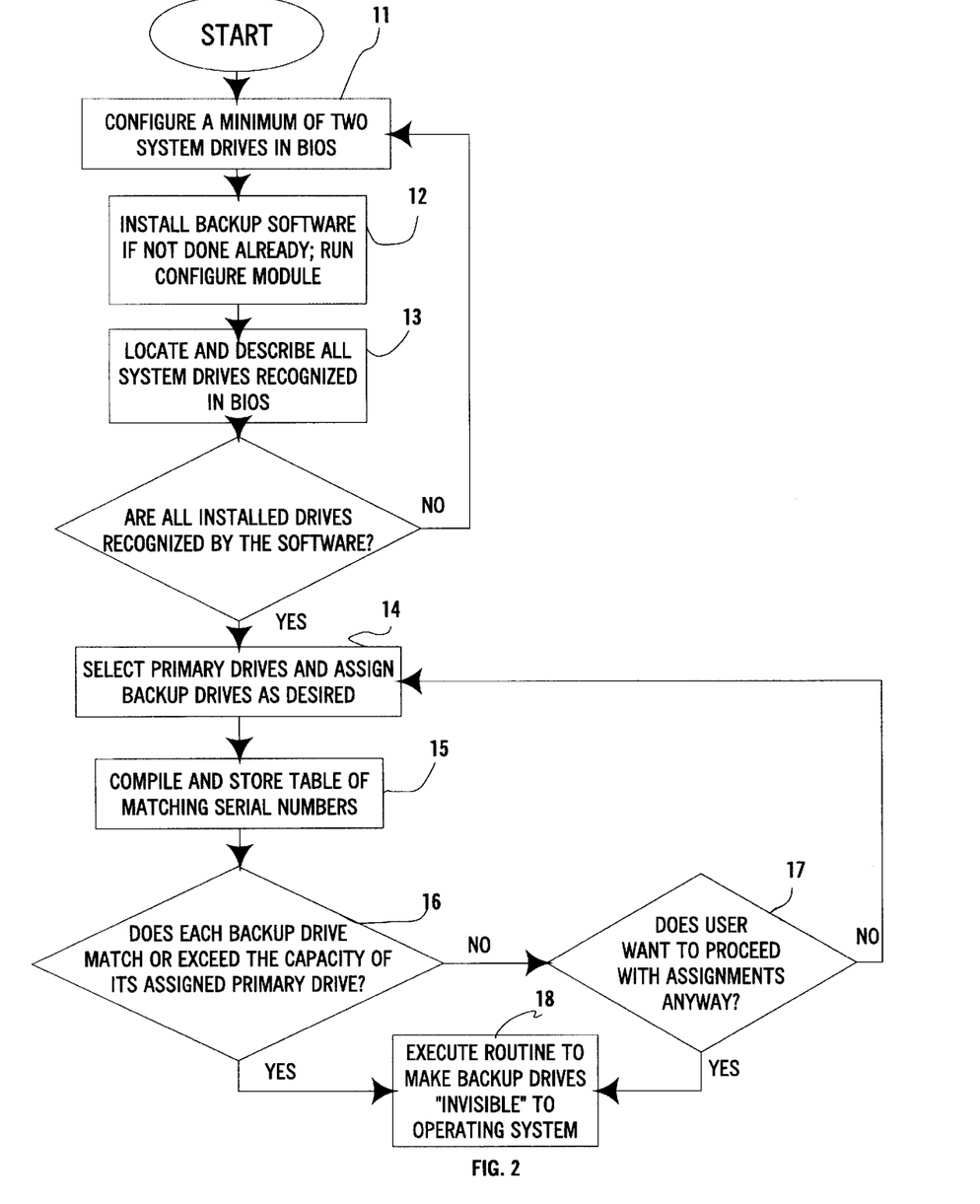
FIG. 2 is a flow chart representative of the process of configuring primary and backup drives upon installation of the backup software.

FIG. 2 is a schematic flow chart that illustrates the steps used in the described embodiment of the invention to configure the backup drives, in (for example) a system such as that illustrated in FIG. 1, in such a way as to make them invisible to the computer's operating system. The first step (Step 11) allows the user to configure a minimum of two disk drives in a system, one of which is the boot drive, and the other of which is to be assigned the backup role. Additional primary data storage devices and drives, and the hard-disk backup drives that may be assigned to them, are also configured in BIOS at Step 11 as well. This may be done by using cables and jumpers as necessary to assign the appropriate status as "master" or "slave". If the disk drive is on a Small Computer System Interface (SCSI) channel (as opposed to an IDE channel), the configuration process will take place during the process of installing a SCSI card in the computer, and will involve setting jumpers or software to designate appropriate SCSI identification (ID) numbers, rather than master/slave status. Once the card and ID numbers are configured appropriately, the computer BIOS will "see" the SCSI drive (or drives). After checking the configurations, the user installs the Backup Software (Step 12). In the embodiment of the invention illustrated here, the software runs on personal computers that use the so-called Disk Operating System (DOS), or one of its many variants. Such computers are also occasionally referred to as "IBM®-compatible computers", since they are based on or derived from a design for a DOS computer first introduced commercially by International Business Machines Corporation in 1986.

The first routine to be executed upon running the software after installation is the configuration of the system drives for backup and restore operations (described in detail below). The software queries the devices through BIOS calls, and reports all disk drives or other storage devices recognized by BIOS, including all disks which are to be configured as backup drives, along with their respective cylinders, heads, sectors and other data showing their capacities (Step 13). If no available backup drive is shown, the user cannot execute the Backup Software. Likewise, if any Primary Device does not appear, it is not yet visible to the computer's BIOS. If the user wants to back up from that drive (or device), the user must then go back to the BIOS (or SCSI) set-up program to reperform the configuration, and change any jumpers or ID numbers as necessary, until it is correct.

Assuming all system drives are properly shown as visible to the computer BIOS, the user is required to designate which system drive is to serve as the backup for a given primary drive (or other storage device) (Step 14). As each primary drive is matched with a backup drive, their respective serial numbers are recorded by the software in a table that preserves the pairing until any subsequent reconfiguration, or replacement of a drive, by the user (Step 15). The software will not allow a backup operation to be performed to any drive other than the one matched to the given primary drive, and will not restore files on the same primary drive from any drive except the backup drive that is matched to it. The configuration table created in Step 15 is just one means of ensuring that after each operation (backup or restore), the paired drives are mirror images of each other (to the degree desired, and specified, by the user). Other means could be created in software, or even in hardware, to produce the same exclusive matching.

During the configuration process, a check is performed by the software to verify that each backup drive selected is of suitable capacity in relation to the Primary Device to which it is assigned, that is, whether its size is equal to or greater than the size of the .corresponding Primary Device (Step 16). If it is not, the user is cautioned that he should designate, and reconfigure if necessary, a drive of suitable capacity to serve as backup (Step 17); otherwise, any backup procedure will cease when the assigned backup drive is full. Once the user elects to proceed with the configuration he or she has set, the software executes a subroutine that renders each designated backup drive thereafter "invisible" to all customary operating systems for personal computers (Step 18). The detailed results of this subroutine, as they occur with respect to the embodiment illustrated herein (an IBM®-compatible personal computer), are shown in FIGS. 3A and 3B.

Figure 3A:
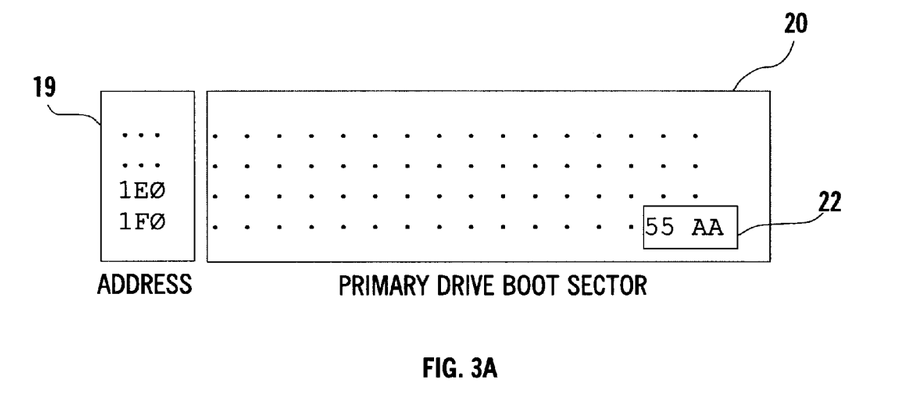
FIGS. 3A and 3B are block diagrams comparing the boot sectors of a primary and a backup drive in the embodiment shown in FIG. 1 after the configuration process in FIG. 2 has been carried out.
Figure 3B:
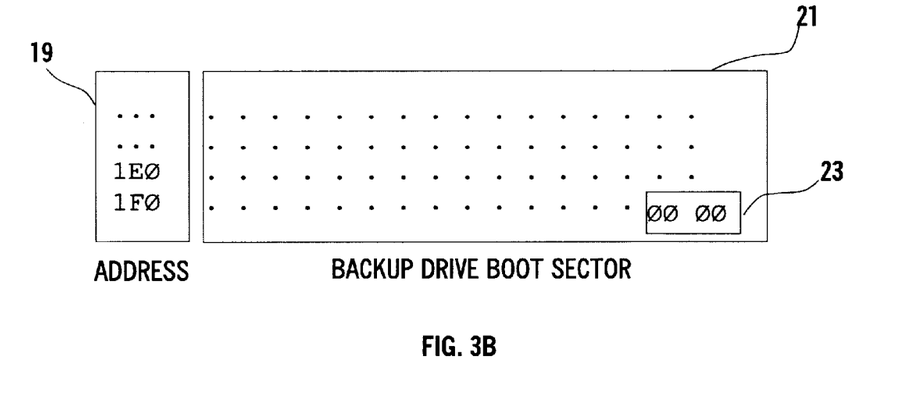

FIGS. 3A and 3B show a portion of the boot sector of a primary drive in an IBM®-compatible personal computer (FIG. 3A), as compared with the same portion of the boot sector of a designated backup drive (FIG. 3B) after execution of the configuration subroutine referred to above. With some exceptions not germane here, most such DOS-based systems are programmed to recognize that device as a disk drive when they read a specific machine language code stored (written) in the boot sector of a hard drive at hexagonal address $1FE-1FF. In this regard, this location serves as a device identifying location. Other characteristics, such as the drive capacity, serial number, and so forth, are read at other addresses, but if the specific DOS machine-language code "55AA" does not appear at hexagonal address $1FE-1FF in the drive's boot sector, DOS will treat the device as other than a disk drive. Specifically, if zeroes are substituted in place of "55AA" at that specific boot sector address, DOS (and most customary DOS-based operating systems) will not even recognize the device as anything to which it can write, or from which it can read: any hard drive with zeroes at hexagonal address $1FE-1FF will thereby be rendered "invisible" to that operating system.

FIGS. 3A and 3B, accordingly, illustrate the relevant hexagonal address portions of the boot sectors of a Primary and a Backup Disk Drive, respectively, in the illustrated embodiment of this invention. The address coordinates are shown in tabular form at 19, and the primary drive Boot Sector is 20, while the corresponding backup drive boot sector is shown as 21. In the figures, the primary drive boot sector machine language code "55AA" at hexagonal address $1FE-1FF (22) is compared to the machine language code at that same address in the boot sector of the backup drive (00 at 23). The zeroes are written to that location by the configuration subroutine of the Backup Software following successful backup drive installation and configuration.

Other computer systems running other operating systems may follow different conventions for recognizing and identifying hard disk drives. The method explained in connection with FIGS. 3A and 3B is a specific method for use in DOS-based operating systems. The scope of the present invention certainly includes other techniques for recognizing and identifying hard drives. The present invention can also be adapted to readily work with other operating systems by modifying the software to make an appropriate change to the boot sector of the designated backup drive (or other backup storage device, such as a removable disk drive or an optical drive, depending on particular user requirements and specifications). Still other techniques of making the operating system behave as though the backup drive contained no data could be employed. For example, the portion of the boot sector containing information about the drive's size could be changed to show a capacity of zero bytes. The Backup Software would store the true capacity for its own use when carrying out backup or restore operations, and would modify the boot sector each time when returning control of the computer to the operating system.

One principal concept illustrated herein, and embodied in the present invention, is that each backup drive or Device is modified by the Backup Software in some appropriate manner that makes it inoperative, and hence invisible, as far as the computer's normal operating system is concerned. Only the Backup Software has the ability to convert each backup drive or Device from visible to invisible status, and back again. In this way, the software forms an exclusive gate for accessing the backup drives or Devices through which all data intended for them, or originating with them, must pass. It is by means of such an exclusive gate that the preferred embodiment of the invention achieves its goal of preserving the integrity of each mirror image kept on the backup drives or Devices, thereby enabling each such device to serve upon a moment's notice as a fully functional replacement for the device it was assigned to back up.

Figure 4:
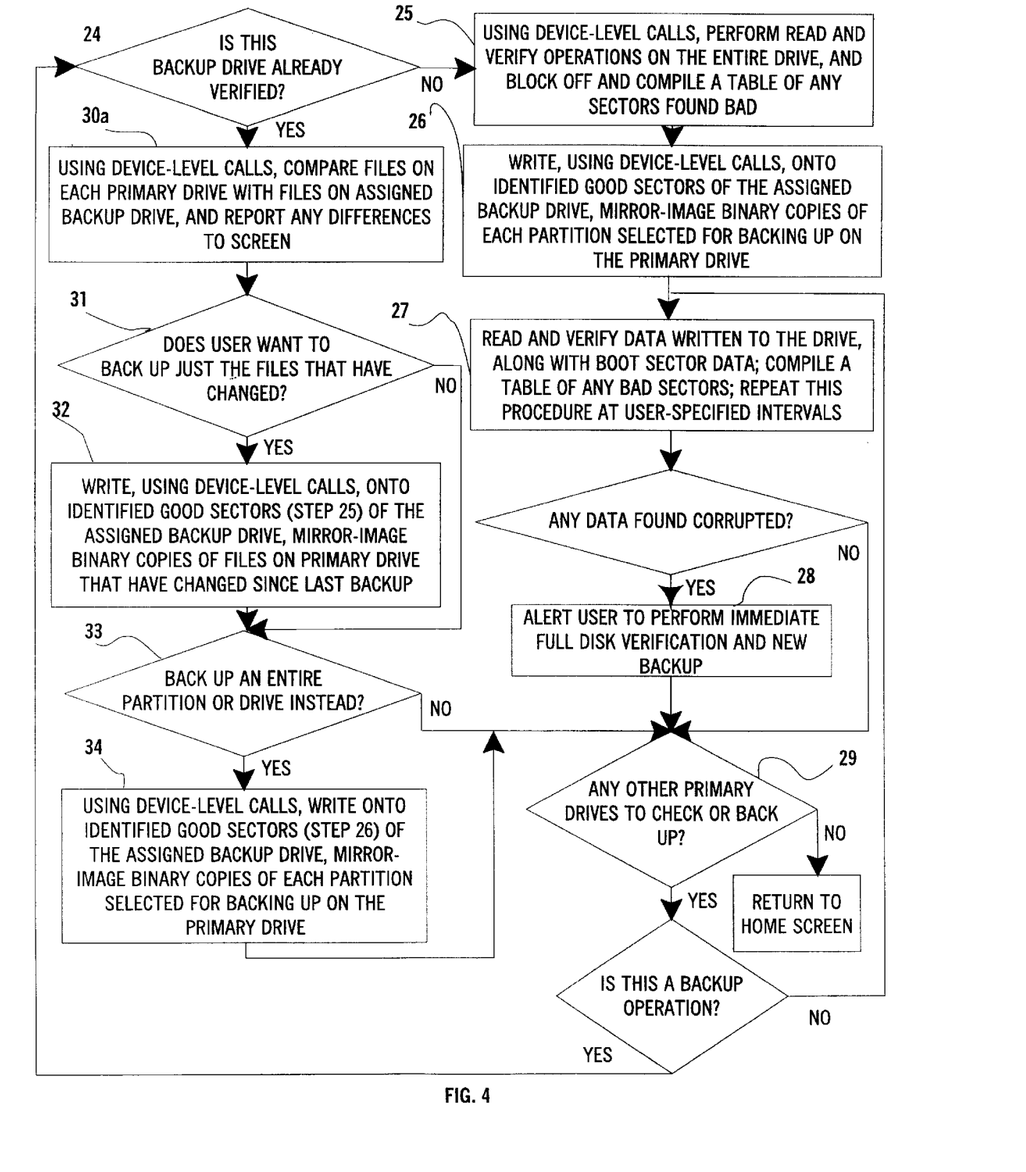
FIG. 4 is a flow chart representative of the backup operation carried out by the backup software with respect to the hardware configuration shown in FIG. 1.

FIG. 4 is a flow chart that explains each step in the backup process carried out by the Backup Software. Upon starting (invoking) the software, it determines if any new backup drives have been installed or configured (Step 24). Before any data can be written to a newly configured backup drive, the software executes an automatic, one-time verification of the entire Drive to identify and block out any bad sectors (Step 25). Full verifications of any drive may thereafter be performed on any drive upon command by the user. The results are kept in a table that can be inspected by the user. To enhance further the reliability of the backup drives, and to protect against intermittent degradation in the intervals between backup operations, the software includes a subroutine that periodically verifies the integrity (readability) of each sector that was written to in the last backup operation, and updates the table listing of bad sectors. This subroutine is executed on each backup drive following the first backup operation to it (see Step 27 below), and thereafter at intervals specified in advance by the user. Preferably, its operation cannot be disabled, but its execution may be delayed to permit the completion of other tasks.

In this fashion, the software maintains information about the reliability (bad sector) status of each backup drive that is updated as frequently as the user chooses to specify. The software is flexible enough to accommodate those users whose programs and data are so critical that the integrity of the backup drives must be checked after each use, an operation which adds to the time spent in backing up data, as well as those users whose concerns require only weekly or monthly integrity checks. A means, however, is preferably provided to monitor potential drive problems and increase the frequency of integrity checks should bad sectors start to show up on a drive. Finally, in the unlikely event that a periodic integrity check (Step 27) shows that a backup file has become corrupted in the interval since the last backup, the user is immediately alerted to perform a full disk verification on the drive in question (Step 28), followed by another backup, so that the data can again be used if necessary to restore files, as explained below.

In the case of a first-time backup, the software will use the bad sector table developed in Step 25 above to avoid writing to any bad sectors on the backup drive. For all subsequent backup operations, it uses the table as updated by the periodic integrity checks (Step 27) of that drive. When executed for the first time, the backup operation backs up all of the files in all selected partitions (which may be the entire drive) of the designated primary drive (Step 26). The program does this by writing exact binary copies of the selected primary drive partitions into the sectors (identified as good) of the assigned backup drive, and using direct calls at the device level. At the conclusion of this first-time backup, the program performs the first of its data integrity checks (Step 27) (in a manner that will be appreciated by those skilled in the art) to ensure that the backed-up files are readable, if necessary on sudden notice, to restore any lost or damaged primary drive files. The process may then be repeated for as many other primary drives as there are in the system (Step 29). The end result is an exact mirror image of each matched primary drive or Device, and the software returns to its home screen.

If backup data has already been written at least once to the assigned backup drive, the software begins, by means of direct calls made at the device level, to read and compare the files on the selected primary drive with their counterparts on the assigned backup drive, and reports any differences found to the user's screen (Step 30a). This gives the user the information needed to determine which version of each file is the most recent, and to determine what needs backing up (or restoring, as described below). The user then selects (Step 31) whether to do a backup of just the files that have changed since the last backup (Step 32), or a full backup of each selected partition or drive, a process that will generally take longer (Steps 33 and 34). With both types of backups, the software consults the backup drive's bad sector table and excludes any sectors identified there from its operations.

In lieu of, or in addition to, manually selected backup operations, the user may preset the software to carry out, at specified intervals with respect to specified primary drives, either a changed-files-only or a full-partition type of backup operation automatically. The implementation of such an embodiment will be understood by those skilled in the art.

When the primary boot drive is backed up in this fashion, the system maintains an exact mirror image of it, which includes all operating system files. Should any critical boot file on the primary drive become corrupted, resulting in a crash of the operating system, the user can execute a drive restore routine (as described below), substitute in the assigned backup drive as the new primary boot drive, and be up and running again in a matter of minutes. If appropriate, the user may then execute a backup procedure from the new Boot Drive to the old (failed) drive. The program then detects and isolates the bad sectors, which caused the crash (Step 25 above), and copies the operating system files from the new primary drive. At that point, the user may continue running the system from the new primary drive, or may switch the previously failed (and now backup) drive back in as the primary drive once again.

Figure 5:
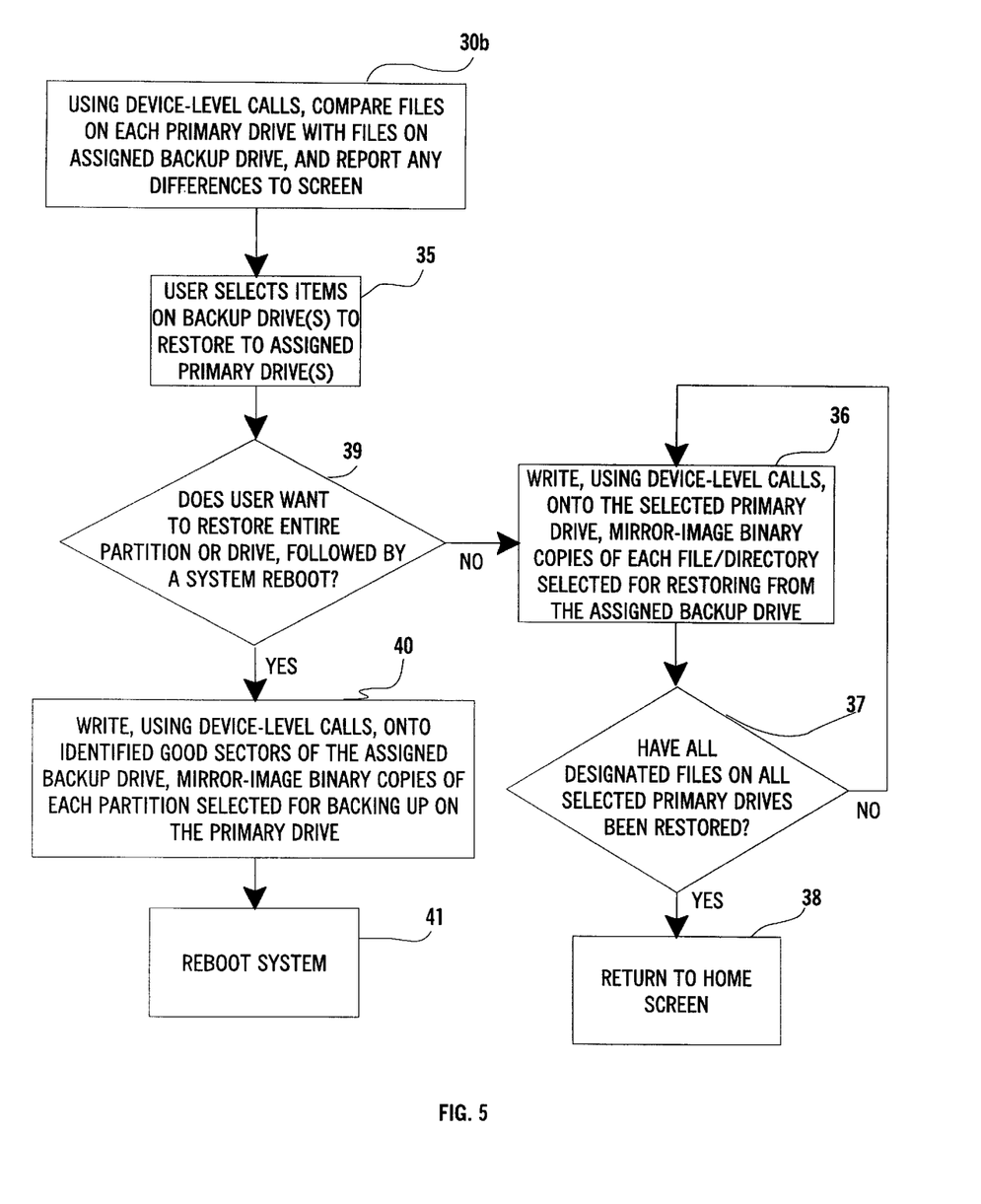
FIG. 5 is a flow chart representative of the process of the restore operation carried out by the backup software with respect to the hardware configuration shown in FIG. 1.

The process for restoring particular files from their backed-up counterparts is basically the reverse of the backup procedure, and is illustrated in FIG. 5. The program begins with the home screen for the selected drive, which, after the first backup procedure, shows the results of the comparison operation shown at Step 30b. The user decides from the information shown which Primary files, directories, partitions or entire Drives need to be restored from their Backup counterparts (Step 35). When the user directs restoration to proceed, the program does so through direct calls at the device level, and makes exact binary copies on the assigned primary drive of the files or directories selected from its matching backup drive (Step 36). If files from additional backup drives were selected, the program restores those files to the appropriate matching primary drives as well (Step 37), and returns to the home screen when done (Step 38). If commanded in the alternative (Step 39), the program will replicate one or more full partitions from the backup drive (including the entire Drive itself) (Step 40), in which event the program reboots the computer to give the operating system an opportunity to reorient itself to all of the rewritten files (Step 41). As with the backup operation, the end result is identical replication of the designated files, directories, partitions or drives.

For purposes of clarification, Steps 30a and 30b of FIGS. 4 and 5 are the same step. It is preferably a step performed at a menu level, and transition to Step 31 (FIG. 4) or to Step 35 (FIG. 5) is determined by user selection.

Figure 6:
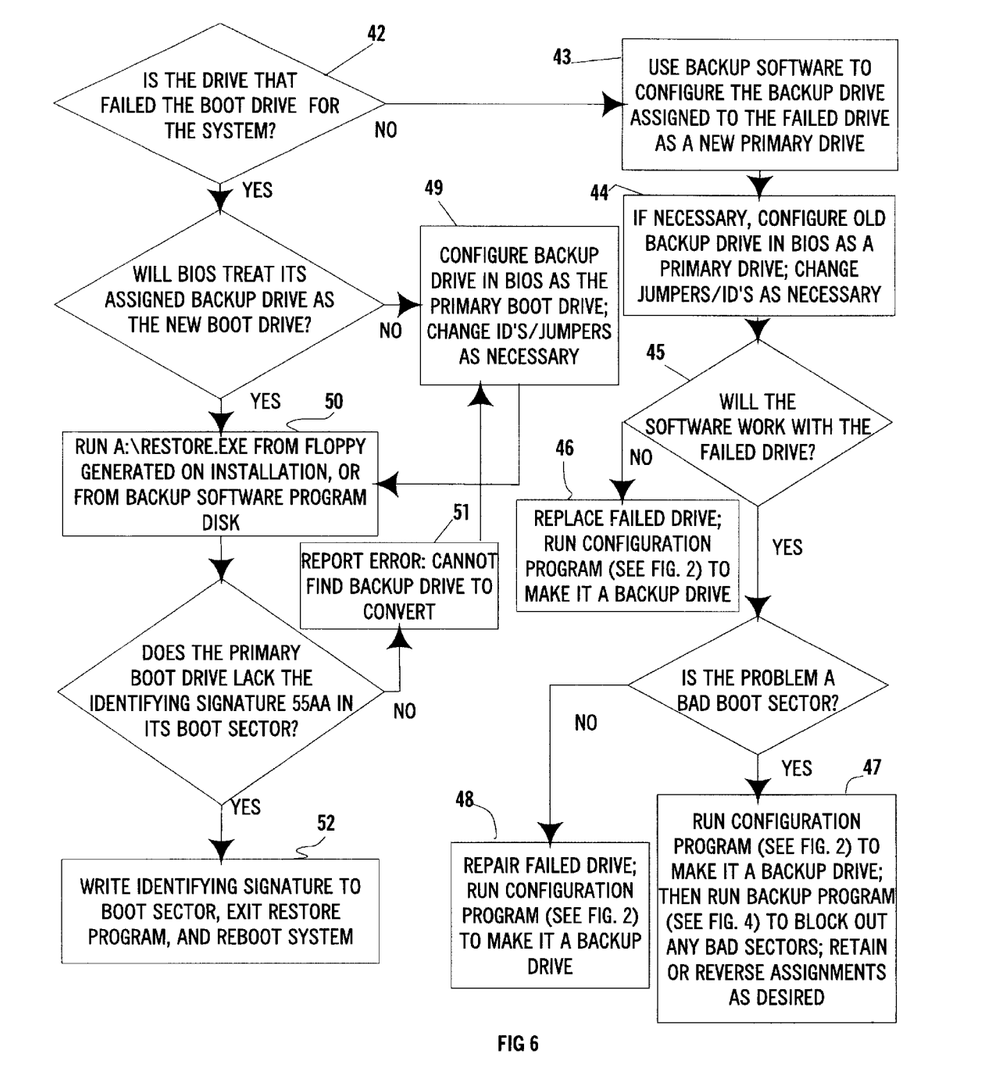
FIG. 6 is a flow chart representative of the process of substituting a backup drive for a failed primary system drive with respect to the hardware configuration shown in FIG. 1.

FIG. 6 explains in a flow chart the operation of the recovery portion of the backup software or the preferred embodiment of the invention, as it is used to replace a drive that has failed. When the Back-up Software is installed, it gives the user the option to create a floppy disk labeled "System Recovery Disk". This places a program called, for example, "RESTORE.EXE" on the floppy disk, which is bootable (in this embodiment of the invention) in DOS computers, such as IBM-compatible personal computers. Operation of this program (or an equivalent) is critical to restoring operations in the event of a primary boot drive failure, and its operation is explained in detail below.

Figure 7:
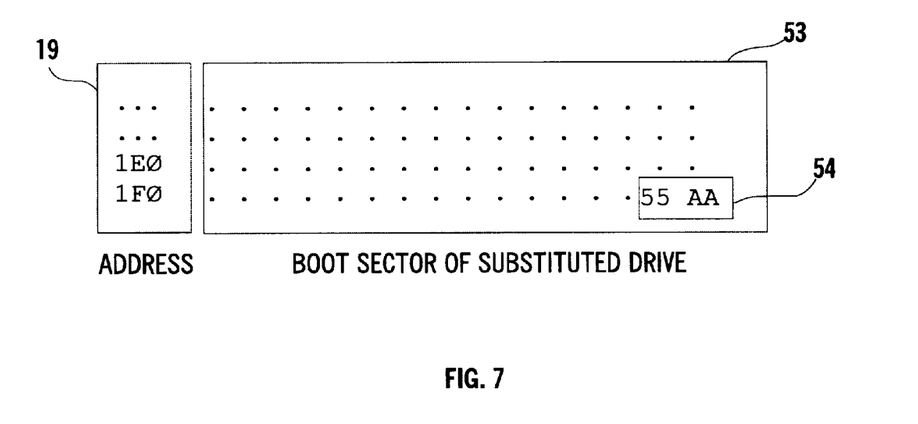
FIG. 7 is a block diagram showing the boot sector of the former backup drive that is now being used to replace the (failed) primary drive in the configuration shown in FIG. 1 after execution of the special boot program provided by the software for use after primary disk failure.

The process is shorter if the failure occurs on a drive other than the primary boot drive (Step 42), because the operating system will continue to function and the Backup Software program may be invoked within it. The user then instructs the backup software to configure the backup drive assigned to the failed primary drive as a new primary drive (Step 43). The software executes a routine that replaces (as one example in this embodiment of the invention) the zeroes in the backup drive's boot sector at hexagonal address $1FE-1FF (23) with the identification code "55AA" (see 54 on FIG. 7). If also required, the user makes any necessary changes (the need of which will be understood by persons skilled in the art) in BIOS, jumpers, cables or SCSI ID numbers so that the drive will function as a primary drive in the operating system (Step 44). The user may then work with all of the duplicate files on the new primary drive.

If the Backup Software still recognizes the failed drive and allows its status to be changed (from Primary to backup drive) (Step 45), the odds are strong that the boot sector is intact and that the disk may be fully repaired (Step 47) by running the verify routine (Step 25) and then backing up to it as desired (Step 26), or by making other appropriate repairs (Step 48). If the software cannot recognize the failed disk, or cannot write to its boot sector, then the disk is probably damaged beyond repair. In that event, the user replaces it with a new one and executes the configuration program to assign the new drive as a Backup to the appropriate primary drive (Step 46).

If the drive that fails is the primary boot drive, the user will be unable to run the operating system. This is the catastrophic disk crash feared by all computer users, and until the advent of this invention, it usually meant hours or even days of down time until a new primary drive could be purchased and installed, formatted, and loaded with all of the user's applications and other programs. With the present invention, however, the replacement process need take only a matter of minutes. For example, it may begin with the user changing, in BIOS, the configuration of the Backup Disk to be assigned to the Boot Drive so that the computer will recognize that disk as the fixed Boot Drive for the system (Step 49). (Because fixed drives are subject to failure, most BIOS programs are configured to search for a boot program first on the system's floppy drive, and only second on the designated fixed boot drive. If required, the user should configure BIOS to execute that same search priority as well.) This configuration process may require, as described earlier, the moving of cables or jumpers or the assignment of a new SCSI ID, depending upon the type of drive and the system hardware configuration, but it is not lengthy. The user then puts into the system floppy drive the System Recovery Disk that was generated on installation of the Backup Software. On exiting the computer's BIOS set-up program (if the computer doesn't automatically treat the assigned backup drive as the new boot drive), the system boots from the floppy drive in accordance with its preset priorities, and the user tells the computer to execute the program "RESTORE.EXE" that is on the floppy (Step 50). This program locates the hard drive set in BIOS as the boot drive, and verifies that it is the former backup drive by checking its boot sector to confirm that zeroes are written as an identifying signature in the boot sector at hexagonal address $1FE-1FF (23). Or, similarly, that the identifying signature "55AA" is not written in the boot sector. If it cannot verify that the boot drive is a backup drive, it reports that fact (Step 51), and the user must recheck the configurations in BIOS (Step 49). If the backup software finds the identifying signature as a backup drive, the backup software proceeds (Step 52) to replace the zeroes in the drive's boot sector 53 at hexagonal address $1FE-1FF with the DOS-based identity code "55AA" (54), as shown on FIG. 7. The user then removes the floppy disk and reboots the system. The new drive is recognized as the fixed System Boot Drive, and because it contains a full mirror image of the boot drive that was used until it failed, the user will have intact and functioning all of the files and programs, as well as the operating system with all of its installed device drivers, preferences, and other details that are particular to each user. The system will look to the user, and will operate, exactly as it did at the time of the last backup operation performed before the disk failure occurred. As is the case with other drive failures, the user then has the option of repairing the old boot drive and configuring it as desired, if the software can still do so (Step 45 above), or of replacing the failed drive with a new one and configuring that one as a Backup to the primary boot drive (Step 46).

The foregoing description has been presented for purposes of illustration and description. It is not intended to be exhaustive or to limit the invention to the precise forms disclosed. Obvious modifications or variations are possible in light of the above teachings. For example, the primary and backup drives may actually be drive partitions, as opposed to physical drives. Also, consistent with the invention, two or more drives may be designated as primary drives, and backed up (collectively) onto a backup drive.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for providing a backup drive for a computer system having a CPU, a memory, an operating system executing between the CPU and the memory, and a first and second storage device, comprising the steps of:

designating the first storage device as a primary drive;

designating the second storage device as a backup drive;

making the backup drive appear invisible to the operating system;

writing data from the primary drive to the backup drive on a periodic basis, using direct basic input/output service (BIOS) calls; and redesignating the primary drive and the backup drive upon receiving a control command.

2. The method as defined in claim 1, wherein the step of designating the first storage device includes the step of writing a predetermined value into a device identifying location of the first storage device.

3. The method as defined in claim 1, wherein the step of designating the second storage device includes the step of writing a predetermined value into a device identifying location of the second storage device.

4. The method as defined in claim 1, wherein the step of making the backup drive appear invisible includes the step of writing a predetermined value into a device identifying storage location on the backup drive.

5. The method as defined in claim 4, wherein the identifying location is at hexidecimal addresses 0FE and 0FF on the boot sector of the backup drive.

6. The method as defined in claim 1, wherein the data includes operating system files.

7. A computer system having a memory and a central processing unit (CPU) comprising:

first storage device having a device identifying mechanism;

second storage device having a device identifying mechanism;

an operating system responsive to a predetermined value in the device identifying mechanism of the first and second storage devices, for execution between the memory and the CPU, the operating system having access to the first and second storage devices, said access controlled by the state of the device identifying mechanism of each device;

means for designating the first storage device as a primary drive and the second storage device as a backup drive, the means operative to control the state of the device identifying mechanism of each of the storage devices;

means for making the backup drive appear invisible to the operating system wherein said means writes data from the primary drive to the backup drive on a periodic basis, using direct basic input/output service (BIOS) calls;

means for periodically copying data from the primary drive to the backup drive; and means responsive to a control condition for redesignating the second storage device as the primary drive and the first storage device as the backup drive, the means operative to control the state of the device identifying mechanism of each of the storage devices.

8. The computer system as defined in claim 7, wherein the data copied includes at least a portion of the operating system.

9. The computer system as defined in claim 7, wherein the means for periodically copying data from the primary drive to the backup drive includes a code segment that instructs the CPU to execute direct basic input/output service (BIOS) calls that write data directly to the backup drive.

10. The computer system as defined in claim 7, further including means for evaluating storage locations of the backup drive to determine whether they are good or corrupt.

11. The computer system as defined in claim 10, further including means responsive to the means for evaluating for constructing a table reflecting those locations that are good and those locations that are corrupt.

12. The computer system as defined in claim 11, wherein the means for periodically copying data is responsive to the constructed table to write data to the back-up drive, only into those locations indicated by the constructed table as not corrupt.

13. A computer readable medium containing program code for controlling the operation of a computer system having a memory, a central processing unit (CPU), a first storage device having a device identifying storage location, a second storage device having a device identifying storage location, the program code comprising:

means for designating the first storage device as a primary drive and the second storage device as a backup drive, the means operative to control the value stored in the device identifying location of each of the storage devices;

in the device identifying location of each of the storage devices;

means for making the backup drive appear invisible to the operating system wherein said means writes data from the primary drive to the backup drive on a periodic basis, using direct basic input/output service (BIOS) calls;

means for periodically copying data from the primary drive to the secondary drive; and means responsive to a control condition for redesignating the second storage device as the primary drive and the first storage device as the backup drive, the means operative to control the value stored in the device identifying location of each of the storage devices.

14. The computer readable medium as defined in claim 13, wherein the control condition is an error condition.

15. The computer readable medium as defined in claim 13, wherein the control condition is a user command.

16. The computer system as defined in claim 13, wherein the means for periodically copying data from the primary drive to the backup drive includes a code segment that instructs the CPU to execute direct basic input/output service (BIOS) calls that write data directly to the backup drive.

17. The computer readable medium as defined in claim 13, wherein the first storage device is a disk drive.

18. The computer readable medium as defined in claim 13, wherein the first storage device is a partitioned area of a disk drive.

19. The computer readable medium as defined in claim 13, wherein the second storage device is a disk drive.

20. The computer readable medium as defined in claim 13, wherein the second storage device is a partitioned area of a disk drive.

21. The computer readable medium as defined in claim 13, wherein the second storage device is at least the same size as the first storage device.

22. The computer readable medium as defined in claim 13, wherein the first storage device is at least two disk drives.

23. The computer readable medium as defined in claim 13, wherein the means for designating includes program code configured to control the value of the device identifying storage location of the first and second storage devices.

24. The computer readable medium as defined in claim 13, wherein the device identifying storage locations include a memory location on a boot sector of the first storage device.

25. The computer readable medium as defined in claim 24, wherein the memory location is a sixteen bit value located at hexidecimal addresses 1FE and 1FF of the boot sector of the first storage device.

26. A computer readable medium containing program code for controlling a method for providing a backup drive for a computer system having a CPU, a memory, an operating system executing between the CPU and the memory, and a first and second storage device, comprising the steps of:

designating the first storage device as a primary drive;

designating the second storage device as a backup drive;

making the backup drive appear invisible to the operating system;

writing data from the primary drive to the backup drive on a periodic basis, using direct basic input/output service (BIOS) calls; and redesignating the primary drive and the backup drive upon receiving a control command.

* * * * *